US010598964B2

(12) United States Patent
Kanno et al.

(10) Patent No.: US 10,598,964 B2
(45) Date of Patent: Mar. 24, 2020

(54) METHOD FOR GENERATING OPTICAL SIGNAL, AND DEVICE FOR GENERATING OPTICAL SIGNAL

(71) Applicant: NATIONAL INSTITUTE OF INFORMATION AND COMMUNICATIONS TECHNOLOGY, Koganei-shi, Tokyo (JP)

(72) Inventors: Atsushi Kanno, Koganei (JP); Tetsuya Kawanishi, Koganei (JP)

(73) Assignee: National Institute of Information and Communications Technology, Tokyo (JP)

(*) Notice: Subject to any disclaimer, the term of this patent is extended or adjusted under 35 U.S.C. 154(b) by 0 days.

(21) Appl. No.: 16/079,096

(22) PCT Filed: Feb. 23, 2017

(86) PCT No.: PCT/JP2017/006902
§ 371 (c)(1),
(2) Date: Aug. 23, 2018

(87) PCT Pub. No.: WO2017/146166
PCT Pub. Date: Aug. 31, 2017

(65) Prior Publication Data
US 2019/0094573 A1 Mar. 28, 2019

(30) Foreign Application Priority Data
Feb. 24, 2016 (JP) .................... 2016-033572

(51) Int. Cl.
*G02F 1/035* (2006.01)
*G02F 1/01* (2006.01)
(Continued)

(52) U.S. Cl.
CPC ............ *G02F 1/0123* (2013.01); *G02F 1/225* (2013.01); *H04B 10/54* (2013.01); *G02F 2001/212* (2013.01)

(58) Field of Classification Search
USPC .............................................. 385/2
See application file for complete search history.

(56) References Cited

U.S. PATENT DOCUMENTS

2012/0128289 A1* 5/2012 Kuwahara ............ G02F 1/0123
385/2
2015/0222365 A1* 8/2015 Goebuchi ............ G02F 1/0123
398/188

FOREIGN PATENT DOCUMENTS

EP 2148235 A1 1/2010
JP 2001244896 A 9/2001
(Continued)

OTHER PUBLICATIONS

International Search Report of International Patent Application No. PCT/JP2017/006902 completed May 9, 2017 and dated May 30, 2017 (4 pages).
(Continued)

Primary Examiner — Eric Wong
(74) Attorney, Agent, or Firm — Pyprus Pte Ltd

(57) ABSTRACT

To provide a method whereby a bias voltage capable of easily realizing a required extinction ratio can be controlled by utilizing a high-extinction ratio modulator even when a generic AD converter/control board is used, and a device for realizing the method. In the present invention, the step quantity (variation quantity) $\Delta V$ of a control voltage is no more than 0.1 times the half-wave voltage $V_\pi$ [V]. For example, in the case of searching for the minimum point, the light intensity is measured when a bias that is larger by the step voltage $\Delta V$ and a bias that is smaller by the step voltage $\Delta V$ are applied, the current bias voltage being used as a reference, and the bias voltage is moved toward the smaller of the measured light intensities. The process of setting the moved bias voltage as a reference, comparing the light intensities for the bias points in both neighboring positions, and changing the reference bias voltage is then repeated. A configuration may be adopted whereby $\Delta V$ then gradually decreases in accordance with a predetermined algorithm.

5 Claims, 2 Drawing Sheets

(51) Int. Cl.
*H04B 10/54* (2013.01)
*G02F 1/225* (2006.01)
*G02F 1/21* (2006.01)

(56) References Cited

FOREIGN PATENT DOCUMENTS

| JP | 2008292985 A | 12/2008 |
|---|---|---|
| JP | 5035411 B | 7/2011 |
| JP | 4849621 B | 1/2012 |
| JP | 5137042 B | 2/2013 |
| JP | 5354528 B | 11/2013 |
| JP | WO2014034047 A1 | 3/2014 |
| JP | 2016102870 A | 6/2016 |

OTHER PUBLICATIONS

Written Opinion of International Patent Application No. PCT/JP2017/006902 completed May 9, 2017 and dated May 30, 2017 (4 pages).

\* cited by examiner

METHOD FOR GENERATING OPTICAL SIGNAL, AND DEVICE FOR GENERATING OPTICAL SIGNAL

TECHNICAL FIELD

The present invention relates to a method for generating an optical signal and to a device for generating an optical signal, that, for an optical modulator having a high extinction ratio, are capable of maintaining optical signal quality while having a desired extinction ratio, by a simple bias voltage adjustment.

BACKGROUND ART

Millimeter wave or terahertz wave band radar is capable of providing small foreign object debris detection and high radar resolution due to its short wavelength and its wide band. For this reason, millimeter wave or terahertz wave band radar is useful as a detection technique for foreign object debris that may intrude into the infrastructure of society. However, in the millimeter wave or terahertz wave band, propagation losses (free space propagation losses that are proportional to the square of the wavelength, and absorption due to water vapor and so on in the atmosphere) are high. Accordingly, even if a single millimeter wave or terahertz wave band radar is used alone, it is difficult to detect foreign object debris over a wide area. In addition, it is not practical to provide a millimeter wave or terahertz wave band radar in each of a number of radar heads, because an expensive and highly precise signal generator is required to detect foreign objects at high accuracy.

A fiber radio (RoF) technique is per se known of superimposing a signal emitted from a high precision signal source arranged in the center upon an optical signal and distributing the result to a number of radar heads via a low loss optical fiber network. Generally, in order to implement a high signal to noise (SN) ratio, a high extinction ratio optical modulator (having a high SN ratio) is needed. It has been considered that a high extinction ratio optical modulator is optimal for generating a high precision millimeter wave or terahertz wave signal, since it is possible to implement a high optical SN ratio by employing a high extinction ratio modulator, because unnecessary sidebands can be suppressed, For example, with double sideband suppressed carrier modulation (DSB-SC) which implements generation of an optical two-tone signal having optical doubling, the bias voltage of a Mach-Zehnder optical modulator is controlled to the transfer function minimum point. In other words, the bias voltage is controlled so that the optical output becomes minimum when no RF signal is applied. Moreover, for example, with optical quadrupling, in a similar manner, the bias voltage is controlled so that the optical output becomes maximum when no RF signal is applied (refer, for example, to Japanese Patent No. 4,849,621 (Patent Document No. 1 cited below)).

Since a DSB-SC modulation method is used with the optical doubling technique employing an optical modulator, accordingly it has been necessary to perform minimum point modulation for the bias voltage. However since, with a high extinction ratio modulator, the extinction ratio reaches 60 dB or higher, accordingly the allowable range for bias control to yield the optical minimum point and maximum point is extremely narrow, and it has been difficult to perform this control to the minimum point/maximum point with a cheap generic AD converter/control board. In fact, with an adjustable bias voltage of around 12 V, even if control is performed at 0.1 mV or less, sometimes it may happen that the search for the optimum point continues without reaching the minimum point. Furthermore, it also possibly may happen that the point that the control algorithm decides is the minimum point or the maximum point is not the desired control point, but is a local minimum point or maximum point that actually has appeared due to a malfunction of the system or the like. Moreover, in the case of a signal having a high SN ratio such as is required for radar or the like, with a conventional optical modulator having an extinction ratio of around 30 dB, it has been essential to operate at the optical minimum point or maximum point.

A method for adjustment of the optical minimum point and the optical maximum point (i.e., of the bias null point and the bias full point), and a method for evaluation of the characteristics of an optical modulator, are described in Japanese Patent 5,035,411, Japanese Patent 5,137,042, and Japanese Patent 5,354,528, for example.

CITATION LIST

Patent Literature

Patent Document No. 1: Japanese Patent 4,849,621.
Patent Document No. 2: Japanese Patent 5,035,411.
Patent Document No. 3: Japanese Patent 5,137,042.
Patent Document No. 4: Japanese Patent 5,354,528.

SUMMARY OF INVENTION

Technical Problem

An object of the present invention is to provide a method that, by employing a high extinction ratio modulator, is capable of controlling a bias voltage that can implement a desired extinction ratio simply and easily, even when a generic AD converter/control board is used, and to provide a device that implements that method. Furthermore, another object of the present invention is to provide a method that avoids local lock-in operation to a local minimum point or to a local maximum point, and to provide a device that implements that method.

Solution to Technical Problem

The present invention is based upon the realization that, for an optical modulator that has a high extinction ratio, it is easy to reach a desired extinction ratio, even if simple bias control is performed to compare and optimize the output intensities at two neighboring bias voltages.

To explain in concrete terms, the step amount $\Delta V$ (i.e. the variation amount) of the control voltage is set to less than or equal to 0.1 of the half-wave voltage $V_\pi$ [V]. For example, when searching for the minimum point, the present bias voltage is taken as a reference, the optical intensities are measured when applying a bias voltage that is higher by the step voltage $\Delta V$ and when applying a bias voltage that is lower by the step voltage $\Delta V$, and the bias voltage is shifted toward the smaller of these. And the operations of taking this bias voltage that has thus been shifted as a reference, comparing together the optical intensities at the bias points that are the two neighboring potentials, and changing the reference bias voltage are repeated. At this time, it would also be acceptable to arrange to reduce $\Delta V$ gradually according to a predetermined algorithm.

Local lock-in operation to a local minimum point or to a maximum point (an absolute minimum point or an absolute maximum point) can be avoided by always shifting the bias voltage by only performing comparison of two neighboring points.

Advantageous Effects of Invention

According to the present invention, it is possible to provide a method that, by employing a high extinction ratio modulator, is capable of controlling a bias voltage that can implement a desired extinction ratio simply and easily, even when a generic AD converter/control board is used, and to provide a device that implements that method. Furthermore, the present invention is also capable of providing a method that avoids local lock-in operation to a local minimum point or to a local maximum point, and of providing a device that implements that method.

DESCRIPTION OF EMBODIMENTS

Embodiments of the present invention will now be explained with reference to the drawings. However, the present invention should not be considered as being limited by the embodiments explained below; the concept of the present invention also includes variations of the following embodiments that come within the range of being obvious to a person of ordinary skill in the art.

An adjustment device for a bias voltage applied to an optical modulator and an optical modulator having a bias voltage adjustment unit according to the present invention will now be explained. In the following, a method will be explained of adjusting the bias voltage to the point at which the optical output becomes minimum (this point is the point at which, if only the bias voltage is applied to the optical modulator, the optical output theoretically becomes zero, and is not the point of the minimum in the strict sense, but is the point at which the optical output substantially approaches its minimum, and hereinafter will sometimes simply be termed the "minimum point"). In the following explanation, the half-wave voltage of the optical modulator will be referred to as "$V_\pi$ [V]". The concept of the half-wave voltage of an optical modulator is per se known, and the method by which it is obtained is also per se known.

Figure 1:
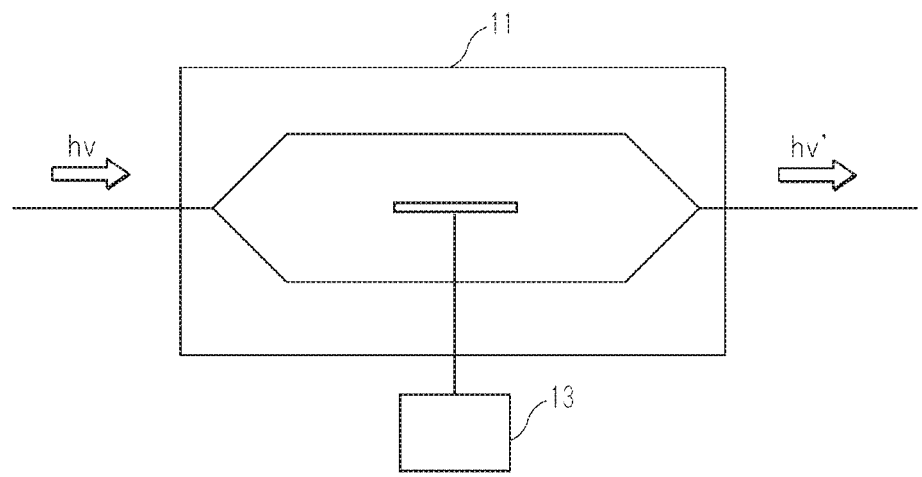
FIG. 1 is a block diagram for explanation of an optical modulator according to the present invention.

FIG. 1 is a block diagram for explanation of an optical modulator according to the present invention. As shown in FIG. 1, this optical modulator is an optical modulator 13 having a bias voltage adjustment unit 11. In this way, the present invention also provides an adjustment device for the bias voltage that is used for the optical modulator. It is desirable for this device to have a photodetector 15 for receiving the optical signal outputted from the optical modulator and for measuring the optical intensity of its optical output for each frequency. Moreover, it is desirable for the bias voltage adjustment unit 11 to be one that is capable of receiving an electrical signal from the photodetector 15 and of adjusting the bias voltage that is outputted from a power supply 17 and applied to the optical modulator.

The optical modulator is preferably one that has a high extinction ratio. A concrete example of an extinction ratio is 40 dB or higher, and more desirably it is 50 dB or higher, or even 60 dB or higher. An example of a drive voltage is a voltage that is greater than or equal to $0.1V_\pi$ [V] and less than or equal to $0.9V_\pi$ [V]. And an example of a bias voltage for phase adjustment is a voltage that generates a relative induced phase amount of greater than or equal to $0.95\pi$ and less than or equal to $1.05\pi$, and normally, in this range, both a drive voltage and a bias voltage are applied to the optical modulator.

An example of an optical modulator is a Mach-Zehnder optical modulator that incorporates a Mach-Zehnder waveguide. A Mach-Zehnder optical modulator may have a Mach-Zehnder waveguide(s). Also, as for example described in Japanese Patent No. 5,035,411, Japanese Patent No. 5,137,042 and Japanese Patent No. 5,354,528, an optical modulator may include a main Mach-Zehnder waveguide having a first arm and a second arm, with the first arm having a first sub-Mach-Zehnder waveguide and the second arm having a second sub-Mach-Zehnder waveguide.

Figure 2:
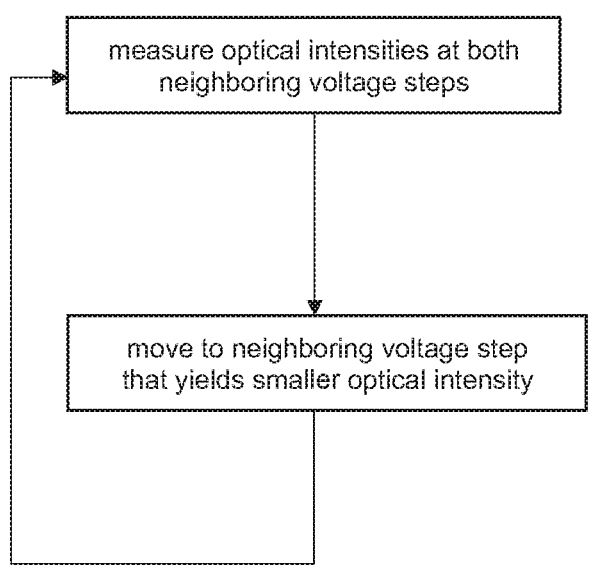
FIG. 2 is a conceptual figure for explanation of a method of adjusting a bias voltage applied to an optical modulator according to the present invention.
Figure 2:
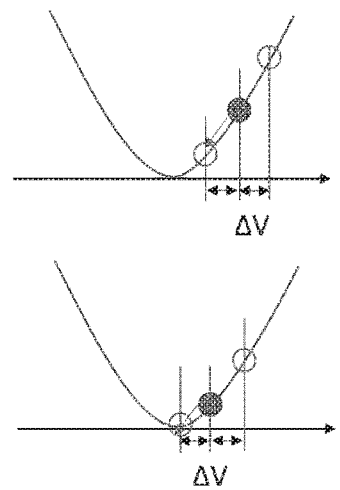

FIG. 2 is a conceptual figure for explanation of a method according to the present invention for adjusting the bias voltage applied to an optical modulator. First, the bias voltage in the present state is taken as being a reference voltage (i.e. a predetermined bias voltage $V_0$). The bias voltage adjustment unit 11 reads out information related to a value $\Delta V_1$ from a storage unit, and controls the voltage value of the bias voltage outputted from the power supply 17. And a first low side bias voltage $V_{11}$ which is obtained by subtracting the value $\Delta V_1$ (which is greater than or equal to $0.001V_\pi$ [V] and less than or equal to $0.1V_\pi$ [V]) from the bias voltage $V_0$ is applied to the optical modulator. The optical modulator outputs light in this state with the bias voltage of $V_0 - \Delta V_1$ [V] being applied. The photodetector 15 receives the optical signal in this state, and measures the optical output for each frequency. And the photodetector 15 converts the measured intensity information of the optical signal into an electrical signal, which it transmits to the bias voltage adjustment unit 11. At this time, the bias voltage adjustment unit 11 stores this measured optical intensity as a first optical output $I_{V11}$.

While $\Delta V_1$ [V] also varies according to the magnitude of $V_\pi$ [V], for example, it may be greater than or equal to 1 mV and less than or equal to 1 V, or may be greater than or equal to 10 mV and less than or equal to 500 mV, or may be greater than or equal to 20 mV and less than or equal to 300 mV, or may be greater than or equal to 50 mV and less than or equal to 200 mV.

Next, the bias voltage adjustment unit 11 applies to the optical modulator a first high side bias voltage $V_{12}$ which is obtained by adding the value $\Delta V_1$ (which is greater than or equal to $0.001V_\pi$ [V] and less than or equal to $0.1V_\pi$ [V]) to the bias voltage $V_0$. And the optical modulator outputs light in the state in which this bias voltage of $V_0 + \Delta V_1$ [V] is being applied. The photodetector 15 receives the optical signal in this state, and measures the optical output for each frequency. And the photodetector 15 converts the measured intensity information of the optical signal into an electrical signal, which it transmits to the bias voltage adjustment unit 11. At this time, the bias voltage adjustment unit 11 stores the measured optical intensity as a second optical output $I_{V12}$.

The bias voltage adjustment unit 11 reads out the first optical output $I_{V11}$ and the second optical output $I_{V12}$ from the storage unit, and compares these two values together. And, when finding the optical minimum point, the bias voltage that yields the smaller optical output between the first optical output $I_{V11}$ and the second optical output $I_{V12}$ is employed as the reference voltage. This bias voltage that gives the smaller optical output becomes a candidate for the bias null point that yields the minimum value. The bias voltage adjustment unit 11 adjusts the output voltage from the power supply 17, and may apply this voltage that has become the candidate for the optical minimum point as described above as the new reference voltage for the bias voltage to be applied to the optical modulator 13.

Adjustment of the bias voltage as described above may be performed at predetermined time intervals.

Figure 3:
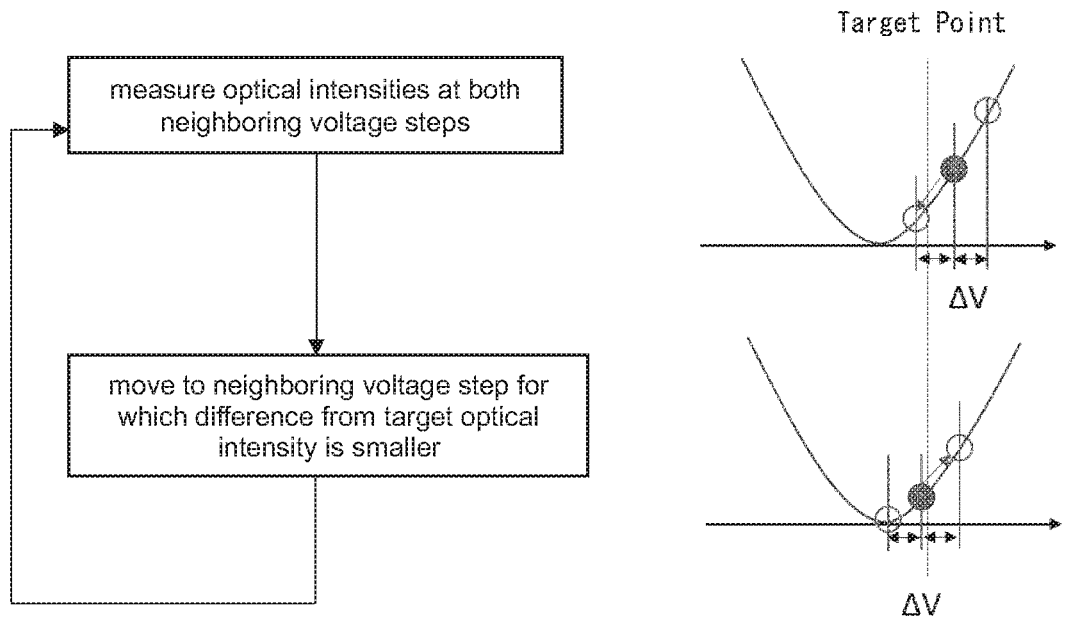
FIG. 3 is a conceptual figure for explanation of the method of adjusting a bias voltage applied to an optical modulator according to the present invention.

FIG. 3 is a further conceptual figure for explanation of the method according to the present invention of adjusting the bias voltage applied to an optical modulator. Furthermore, the new reference voltage that has been obtained as described above is taken as being a second predetermined bias voltage $V_{02}$, the optical output when a low side bias voltage $V_{21}$ which is obtained by subtracting a value $\Delta V_2$ [V] (which is greater than or equal to $0.001V_\pi$ [V] and less than or equal to $0.1V_\pi$ [V]) from the bias voltage $V_{02}$ is applied to the optical modulator and the optical output when a bias voltage $V_{22}$ which is obtained by adding the value $\Delta V_2$ [V] to the bias voltage $V_{02}$ is applied to the optical modulator are compared together, and the bias voltage that yields the smaller optical output between the these optical outputs is taken as a new reference voltage (i.e. as a candidate for the optical minimum point). And in this manner, with the new reference voltage, it may be arranged to repeat the process described above of comparing together the optical outputs when bias voltages that are higher and lower by a specified voltage are applied, and of taking the one of these bias voltages that yields the smaller optical output as the new reference voltage (i.e. as the new bias null point candidate). $\Delta V_1$ and $\Delta V_2$ may be the same, or may be changed.

When searching for the point for which the optical output becomes maximum (i.e. the optical maximum point), the bias voltage that yields between the two optical outputs whose intensity is the greater may be employed as the reference voltage.

Next, another method for obtaining the minimum point will be explained that is different from the method described above.

In this method, let the target optical intensity for the optical modulator be termed $I_T$ [V]. The bias voltage adjustment unit 11 is adapted to store information related to $I_T$ [V] in the storage unit, and to read it out as appropriate.

The bias voltage in the present state is taken as the reference voltage (the predetermined bias voltage $V_0$). First, by the method explained above, the bias voltage adjustment unit 11 stores the first optical output $I_{V11}$. Then the bias voltage adjustment unit 11 reads out the information related to $I_T$ [V], obtains a first optical intensity difference $V_{D1}$ which is the difference between the optical intensity $I_T$ that is the target and the first optical output $I_{V11}$, and stores this in the storage unit.

Subsequently, first, according to the method explained above, the bias voltage adjustment unit 11 stores the second optical output $I_{V12}$. And the bias voltage adjustment unit 11 reads out the information related to $I_T$ [V], obtains a second optical intensity difference $V_{D2}$ which is the difference between the optical intensity $I_T$ that is the target and the second optical output $I_{V12}$, and stores this in the storage unit.

The bias voltage adjustment unit 11 then reads out the first optical intensity difference $V_{D1}$ and the second optical intensity difference $V_{D2}$, and employs the one of the bias voltages that yields the smaller optical output among the first optical intensity difference $V_{D1}$ and the second optical intensity difference $V_{D2}$ as the new reference voltage (i.e. the new candidate for the desired extinction ratio implementation point).

In this manner, the process is repeated of comparing together the optical intensity differences when a bias voltage that is higher by a predetermined voltage is applied and when a bias voltage that is lower by a specified voltage is applied, and of taking the bias voltage that yields the smaller value as the reference voltage (i.e. as the new candidate for the desired extinction ratio implementation point).

Concrete Example No. 1

The following control program was implemented in the bias voltage adjustment unit. This program reads out information related to $\Delta_{V1}$ from the storage unit, then issues a control command to the power supply so that the power supply applies a first low side bias voltage $V_{11}$ ($V_0-\Delta_{V1}$ [V]) to the optical modulator, and then receives and stores information from the photodetector related to the first optical output $I_{V11}$.

Then a control command is issued to the power supply so that the power supply applies a first high side bias voltage $V_{12}$ ($V_0+\Delta_{V1}$ [V]) to the optical modulator, and receives and stores information from the photodetector related to the second optical output $I_{V12}$.

Then the first optical output $I_{V11}$ and the second optical output $I_{V12}$ are read out from the storage unit, and their values are compared together.

And then the one of these bias voltages that yields the smaller optical output, among the first optical output $I_{V11}$ and the second optical output $I_{V12}$, is stored as a new reference voltage.

This program has the function of causing a control command to be outputted to the power supply, commanding the power supply to apply the new reference voltage as a bias voltage for the optical modulator.

A component with an extinction ratio of 50 dB was used as the optical modulator. The half-wave voltage $V_\pi$ [V] of the optical modulator was 12 V, and the drive voltage was $0.5V_\pi$ [V]. The permissible range of phase bias voltage giving a suppression ratio of 30 dB or greater was from 11.4 to 12.6 V. At this time, the value of 100 mV was employed for $\Delta V$. With the conventional method, it was necessary to measure the optical intensity for each 0.1 mV or so in order to adjust the bias voltage, but with the present invention it was still possible always to maintain a suppression ratio of 30 dB or greater, despite the fact that the coarse adjustment value of 100 mV was adopted.

Concrete Example No. 2

The following control program was implemented in the bias voltage adjustment unit. This program reads out information related to $\Delta V_1$ from the storage unit, then issues a control command to the power supply so that the power supply applies a first low side bias voltage $V_{11}$ ($V_0-\Delta V_1$ [V]) to the optical modulator, and then receives and stores information from the photodetector related to the first optical output $I_{V11}$.

Then a control command is issued to the power supply so that the power supply applies a first high side bias voltage $V_{12}$ ($V_0+\Delta_{V1}$ [V]) to the optical modulator, and receives and stores information from the photodetector related to the second optical output $I_{V12}$.

Then information is read out from the storage unit related to $I_T$ [V], to the first optical output $I_{V11}$, and to the second optical output $I_{V12}$.

And then a first optical intensity difference $V_{D1}$ is obtained, which is the difference between the target optical intensity $I_T$ and the first optical output $I_{V11}$.

Moreover, a second optical intensity difference $V_{D2}$ is obtained, which is the difference between the target optical intensity $I_T$ and the second optical output $I_{V12}$.

And then the one of these bias voltages that yields the smaller optical output, among the first optical intensity difference $V_{D1}$ and the second optical intensity difference $V_{D2}$, is stored as a new reference voltage.

This program has the function of causing a control command to be outputted to the power supply, commanding the power supply to apply the new reference voltage as a bias voltage for the optical modulator.

When the optical modulator was adjusted with similar drive voltage and bias voltage to those of Concrete Example No. 1, it was possible to keep the suppression ratio greater than or equal to 30 dB at all times, despite the use of the coarse voltage adjustment of 100 mV.

INDUSTRIAL APPLICABILITY

The present invention can be applied in the field of optical information communication.

REFERENCE SIGNS LIST

11: bias voltage adjustment unit
13: optical modulator

The invention claimed is:

1. A method for adjusting a bias voltage applied to an optical modulator, including, when a half-wave voltage of the optical modulator being taken as $V_\pi$ [V]:
    a step of applying a first lower side bias voltage $V_{11}$ to the optical modulator, the first lower side bias voltage $V_{11}$ being 0.001 $V_\pi$ [V] to 0.1 $V_\pi$ [V] smaller than a redetermined bias voltage $V_0$ [V],
    a step of obtaining a first lower optical output $I_{V11}$ from the optical modulator when the first low side bias voltage $V_{11}$ is a lied to the optical modulator,
    a step of applying a first upper side bias voltage $V_{12}$ to the optical modulator, the first upper side bias voltage $V_{12}$ being 0.001$V_\pi$ [V] to 0.1$V_\pi$ [V] larger than the predetermined bias voltage $V_0$ [V],
    a step of obtaining a first upper optical output $I_{V12}$ from the optical modulator when the first upper side bias voltage $V_{12}$ is a lied to the optical modulator,
    a step of comparing the first lower optical output $I_{V11}$ and the first upper optical output $I_{V12}$; and
    a step of employing, as a reference voltage, that bias voltage that yields a smaller optical output between the first lower optical output $I_{V11}$ and the first upper optical output $I_{V12}$.

2. A method according to claim 1,
    wherein the reference voltage is taken as a second predetermined bias voltage $V_{02}$,
    the method further comprising:
    a step of applying a second lower side bias voltage $V_{21}$ to the optical modulator, the second lower side bias voltage $V_{21}$ being 0.001$V_\pi$ [V] to 0.1$V_\pi$ [V] smaller than the second predetermined bias voltage $V_{02}$ [V],
    a step of obtaining a second lower optical output $I_{V21}$ from the optical modulator when the second low side bias voltage $V_{21}$ is applied to the optical modulator,
    a step of applying a second upper side bias voltage $V_{22}$ to the optical modulator, the second upper side bias voltage $V_{22}$ being 0.001$V_\pi$ [V] to 0.1$V_\pi$ [V] larger than the second predetermined bias voltage $V_{02}$[V],
    a step of obtaining a second upper optical output $I_{V22}$ from the optical modulator when the second upper side bias voltage $V_{22}$ is applied to the optical modulator,
    a step of comparing the second lower optical output $I_{V21}$ and the second upper optical output $I_{V22}$; and
    a step of employing, as a second reference voltage, that bias voltage that yields a smaller optical output between the second lower optical output $I_{V21}$ and the second upper optical output $I_{V22}$.

3. A method for adjusting a bias voltage applied to an optical modulator, including, when a half-wave voltage of the optical modulator is taken as $V_\pi$ [V], and a target optical intensity for the optical modulator is taken as $I_T$:
    a step of applying a first lower side bias voltage $V_{11}$ to the optical modulator, the first lower side bias voltage $V_{11}$ being 0.001 $V_\pi$ [V] to 0.1 $V_\pi$ [V] smaller than a redetermined bias voltage $V_0$ [V],
    a step of obtaining a first lower optical output $I_{V11}$ from the optical modulator when the first low side bias voltage $V_{11}$ is applied to the optical modulator,
    a step of applying a first upper side bias voltage $V_{12}$ to the optical modulator, the first upper side bias voltage $V_{12}$ being 0.001$V_\pi$ [V] to 0.1 $V_\pi$ [V] larger than the predetermined bias voltage $V_0$ [V],
    a step of obtaining a first upper optical output $I_{V12}$ from the optical modulator when the first upper side bias voltage $V_{12}$ is applied to the optical modulator,
    a step of obtaining a first lower optical intensity difference $V_{D1L}$ that is a difference between the target optical intensity $I_T$ and the first optical lower output $I_{V11}$;
    a step of obtaining a first upper optical intensity difference $V_{D1U}$ that is a difference between the target optical intensity $I_T$ and the first upper optical output $I_{V12}$; and
    a step of employing, as a reference voltage, that bias voltage that yields a smaller optical output between the first lower optical intensity difference $V_{D1L}$, and the first upper optical intensity difference $V_{D1U}$.

4. An optical modulator (13) comprising a bias voltage adjustment unit (11),
    wherein, when a half-wave voltage of the optical modulator (13) is taken as $V_\pi$ [V], the bias voltage adjustment unit (11):
    applying a first lower side bias voltage $V_{11}$ to the optical modulator, the first lower side bias voltage $V_{11}$ being 0.001$V_\pi$ [V] to 0.1$V_\pi$ [V] smaller than a predetermined bias voltage $V_0$ [V],
    obtaining a first lower optical output $I_{V11}$ from the optical modulator when the first low side bias voltage $V_{11}$ is applied to the optical modulator,
    applying a first upper side bias voltage $V_{12}$ to the optical modulator, the first upper side bias voltage $V_{12}$ being 0.001$V_\pi$ [V] to 0.1$V_\pi$ [V] larger than the predetermined bias voltage $V_0$ [V],
    obtaining a first upper optical output $I_{V12}$ from the optical modulator when the first upper side bias voltage $V_{12}$ is applied to the optical modulator,
    comparing the first lower optical output $I_{V11}$ and the first upper optical output $I_{V12}$; and employing, as a reference voltage, that bias voltage that yields a smaller optical output between the first lower optical output $I_{V11}$ and the first upper optical output $I_{V12}$.

5. An optical modulator comprising a bias voltage adjustment unit, wherein, when a half-wave voltage of the optical modulator is taken as $V_\pi$ [V], and a target optical intensity for the optical modulator is taken as $I_T$: the bias voltage adjustment unit:

applying a first lower side bias voltage $V_{11}$ to the optical modulator, the first lower side bias voltage $V_{11}$ being $0.001V_\pi$ [V] to $0.1V_\pi$ [V] smaller than a predetermined bias voltage $V_0$ [V], obtaining a first lower optical output $I_{V11}$ from the optical modulator when the first low side bias voltage $V_{11}$ is applied to the optical modulator, applying a first upper side bias voltage $V_{12}$ to the optical modulator, the first upper side bias voltage $V_{12}$ being $0.001V_\pi$ [V] to $0.1V_\pi$ [V] larger than the predetermined bias voltage $V_0$ [V], obtaining a first upper optical output $I_{V12}$ from the optical modulator when the first upper side bias voltage $V_{12}$ is applied to the optical modulator, obtaining a first lower optical intensity difference $V_{D1L}$ that is a difference between the target optical intensity $I_T$ and the first lower optical output $I_{V11}$;

obtaining a first upper optical intensity difference $V_{D1L}$ that is a difference between the target optical intensity $I_T$ and the first upper optical output $I_{V12}$; and employing, as a reference voltage, that bias voltage that yields a smaller optical output between the first lower optical intensity difference $V_{D1L}$ and the first upper optical intensity difference $V_{D1U}$.

* * * * *